United States Patent
Gouda et al.

(10) Patent No.: US 11,932,548 B2
(45) Date of Patent: Mar. 19, 2024

(54) METHOD FOR MANUFACTURING LITHIUM HYDROXIDE POWDER, METHOD FOR MANUFACTURING POSITIVE ELECTRODE ACTIVE MATERIAL FOR LITHIUM SECONDARY CELL, AND PACKAGE

(71) Applicants: SUMITOMO CHEMICAL COMPANY, LIMITED, Tokyo (JP); TANAKA CHEMICAL CORPORATION, Fukui (JP)

(72) Inventors: Kenji Gouda, Niihama (JP); Keiichiro Suzuki, Niihama (JP); Jun-ichi Kageura, Niihama (JP)

(73) Assignees: SUMITOMO CHEMICAL COMPANY, LIMITED, Tokyo (JP); TANAKA CHEMICAL CORPORATION, Tokyo (JP)

( * ) Notice: Subject to any disclaimer, the term of this patent is extended or adjusted under 35 U.S.C. 154(b) by 796 days.

(21) Appl. No.: 16/976,103

(22) PCT Filed: Feb. 28, 2019

(86) PCT No.: PCT/JP2019/007868
§ 371 (c)(1),
(2) Date: Aug. 27, 2020

(87) PCT Pub. No.: WO2019/168110
PCT Pub. Date: Sep. 6, 2019

(65) Prior Publication Data
US 2020/0407234 A1 Dec. 31, 2020

(30) Foreign Application Priority Data
Mar. 1, 2018 (JP) .................. 2018-036807

(51) Int. Cl.
| | | |
|---|---|---|
| *C01D 15/02* | (2006.01) | |
| *B65D 77/22* | (2006.01) | |
| *B65D 81/18* | (2006.01) | |
| *B65D 85/84* | (2006.01) | |
| *H01M 4/04* | (2006.01) | |
| *H01M 4/48* | (2010.01) | |
| *H01M 10/0525* | (2010.01) | |

(52) U.S. Cl.
CPC .......... *C01D 15/02* (2013.01); *B65D 81/18* (2013.01); *B65D 85/84* (2013.01); *H01M 4/483* (2013.01); *H01M 10/0525* (2013.01); *C01P 2004/61* (2013.01); *C01P 2006/40* (2013.01)

(58) Field of Classification Search
CPC ........ C01D 15/02; B65D 81/18; B65D 85/84; H01M 4/483; H01M 10/0525
See application file for complete search history.

(56) References Cited

U.S. PATENT DOCUMENTS

2016/0351889 A1  12/2016  Swonger et al.

FOREIGN PATENT DOCUMENTS

| CN | 106348318 A | | 1/2017 | |
|---|---|---|---|---|
| CN | 106495188 A | * | 3/2017 | ............. C01D 15/02 |
| CN | 106495188 A | | 3/2017 | |
| CN | 206126867 U | | 4/2017 | |
| CN | 107636204 A | | 1/2018 | |
| JP | 08-104361 A | | 4/1996 | |
| JP | 11-021122 A | | 1/1999 | |
| JP | 2000-233923 A | | 8/2000 | |
| JP | 2006-151707 A | | 6/2006 | |
| JP | 2006151707 A | * | 6/2006 | |
| JP | 2009-277667 A | | 11/2009 | |
| JP | 2011-178584 A | | 9/2011 | |
| JP | 5569034 B2 | | 8/2014 | |

OTHER PUBLICATIONS

Williams et al., Ind. Eng. Chem. Fundam., (1970), 9(3), p. 454-457.*
Chinese Decision of Rejection issued in corresponding Chinese Patent Application No. 201980015664.6, dated Jan. 5, 2023, with English translation.
International Search Report issued in corresponding International Patent Application No. PCT/JP2019/007868, dated Apr. 23, 2019, with English translation.
Extended European Search Report issued in corresponding European Patent Application No. 19760352.5-1108, dated Dec. 7, 2021.
Japanese Notice of Reasons for Refusal issued in corresponding Japanese Patent Application No. 2018-036807, dated Jan. 4, 2022, with English translation.
Chinese Second Office Action issued in corresponding Chinese Patent Application No. 201980015664.6, dated Sep. 19, 2022, with English translation.
Chinese Office Action issued in corresponding Chinese Patent Application No. 201980015664.6, dated Mar. 17, 2022, with English translation.
Office Action issued in corresponding Korean Patent Application No. 10-2020-7024542, dated Jun. 22, 2023, with English translation.
Office Action received in Korean Patent Application No. 10-2020-7024542, dated Nov. 8, 2023 w/English MT.

* cited by examiner

*Primary Examiner* — Yong L Chu
(74) *Attorney, Agent, or Firm* — Rimon PC

(57) ABSTRACT

A method for manufacturing a lithium hydroxide powder includes a pulverizing step of pulverizing coarse particles of lithium hydroxide to obtain lithium hydroxide powder; and a carbonation-suppressing step of storing the lithium hydroxide powder in an airtight container in an atmosphere satisfying requirements (1) and (2).
  (1) A partial pressure of carbon dioxide gas is 100 Pa or less with respect to a total amount of gas present in the airtight container.
  (2) A relative humidity in the airtight container is 60% or less.

3 Claims, No Drawings

METHOD FOR MANUFACTURING LITHIUM HYDROXIDE POWDER, METHOD FOR MANUFACTURING POSITIVE ELECTRODE ACTIVE MATERIAL FOR LITHIUM SECONDARY CELL, AND PACKAGE

CROSS REFERENCE TO RELATED APPLICATIONS

This application is the U.S. National Phase under 35 U.S.C. § 371 of International Application No. PCT/JP2019/007868, filed on Feb. 28, 2019, which claims the benefit of Japanese Application No. 2018-036807, filed on Mar. 1, 2018, the entire contents of each are hereby incorporated by reference.

TECHNICAL FIELD

The present invention relates to a method for manufacturing a lithium hydroxide powder, a method for manufacturing a positive electrode active material for a lithium secondary battery, and a package.

The present application claims priority based on Japanese Patent Application No. 2018-036807 filed in Japan on Mar. 1, 2018, the content of which is incorporated herein.

BACKGROUND ART

Lithium secondary batteries are already being put into practical use not only for small power sources such as mobile phone applications and notebook computer applications, but also for medium or large power sources such as automobiles and power storage applications. As a positive electrode active material used for the positive electrode of a lithium secondary battery, there is a lithium composite metal compound. The lithium composite metal compound is obtained by mixing a lithium compound with a composite metal compound containing nickel, cobalt, or the like and calcining the mixture.

With regard to the positive electrode active material for lithium secondary batteries, various attempts have been made to improve the battery performance of manufactured lithium secondary batteries.

For example, Patent Literature 1 describes lithium hydroxide in which the carbon content and the water content ratio are controlled to be specific values or lower. It is described that, by mixing and calcining lithium hydroxide and a nickel composite oxide, it is possible to stably obtain a lithium-nickel composite oxide provided with excellent charge/discharge characteristics by calcining for a short time.

CITATION LIST

Patent Literature

[Patent Literature 1]
Japanese Unexamined Patent Application, First Publication No. 2011-178584

SUMMARY OF INVENTION

Technical Problem

As described in Patent Literature 1, lithium hydroxide is widely used as a lithium compound for manufacturing a lithium-nickel composite compound.

However, lithium hydroxide reacts with carbon dioxide in the atmosphere to undergo carbonation and easily changes to lithium carbonate. This lithium carbonate may become an impurity. When lithium hydroxide including lithium carbonate as an impurity is used as a raw material for a positive electrode active material, the lithium carbonate is brought into the positive electrode active material. The lithium carbonate brought into the positive electrode active material becomes an impurity. When the amount of lithium carbonate in the positive electrode active material is large, lithium carbonate is decomposed during charging and carbon dioxide gas is easily generated. The generated carbon dioxide gas may cause the battery to swell. Therefore, it is important to suppress the carbonation of lithium hydroxide, which is a raw material, and not change the lithium hydroxide into lithium carbonate.

The present invention was made in view of the above circumstances and an object of the present invention is to provide a method for manufacturing a lithium hydroxide powder in which the generation of lithium carbonate obtained by carbonating lithium hydroxide is suppressed.

Solution to Problem

The present invention encompasses [1] to [9] below.

[1] A method for manufacturing a lithium hydroxide powder, the method including a pulverizing step of pulverizing coarse particles of lithium hydroxide to obtain a lithium hydroxide powder, and a carbonation-suppressing step of storing the lithium hydroxide powder in an airtight container in an atmosphere satisfying requirements (1) and (2):

(1) a partial pressure of carbon dioxide gas of 100 Pa or less with respect to a total amount of gas present in the airtight container, and (2) a relative humidity in the airtight container of 60% or less.

[2] A method for manufacturing a lithium hydroxide powder, the method including a pulverizing step of pulverizing coarse particles of lithium hydroxide to obtain a lithium hydroxide powder, and a carbonation-suppressing step of storing the lithium hydroxide powder after the pulverization in a storage container, in which the storage container is provided with a circulating means for circulating a gas having a low concentration of carbon dioxide at a set flow rate in the storage container, the circulating means has an introduction path for introducing a gas having a low concentration of carbon dioxide into the storage container and a discharge path for discharging gas from the storage container, and an inflow rate of the gas having a low concentration of carbon dioxide into the storage container is 15 L/min or less.

[3] The method for manufacturing the lithium hydroxide powder according to [1] or [2], in which a charging mass (g) in the storage container or in the airtight container with respect to a volume (L) of the storage container or the airtight container (storage mass/volume of airtight container or storage container) is 2 g/L or more.

[4] A method for manufacturing a positive electrode active material for a lithium secondary battery, the method including a step of manufacturing a lithium hydroxide powder by the manufacturing method according to any one of [1] to [3], and a calcining step of mixing the obtained lithium hydroxide powder and a transition metal precursor and calcining the obtained mixture.

[5] A package including a lithium hydroxide powder, and a container airtightly filled with the lithium hydroxide powder, in which a partial pressure of carbon dioxide gas with respect to a total amount of gas present in the container is 100 Pa or less and a relative humidity in the container is 60% or less.

[6] The package according to [5], in which the container has a container body which stores the lithium hydroxide powder, and a lid portion which covers an opening of the container body.

[7] The package according to [5], in which the container is a bag-shaped film packaging container using a laminated film.

[8] The package according to [7], in which the laminated film has a resin film and a metal layer laminated on at least one surface of the resin film.

[9] The package according to [7] or [8], in which an oxygen permeability of the laminated film is 1 ml/$m^2$·day·atm or less.

Advantageous Effects of Invention

According to the present invention, it is possible to provide a method for manufacturing a lithium hydroxide powder in which the generation of lithium carbonate obtained by carbonating lithium hydroxide is suppressed.

DESCRIPTION OF EMBODIMENTS

<Lithium Hydroxide>

The lithium hydroxide of the present invention includes either or both of anhydrous lithium hydroxide and lithium hydroxide monohydrate. In addition, the lithium hydroxide coarse particles of the present invention have an average particle diameter (D50) of 50 μm or more, which is determined by particle size distribution measurement described below.

In the present invention, each value is a value measured by the measuring method below.

<Method for Measuring Inflow Rate of Gas Having Low Concentration of Carbon Dioxide>

In the present embodiment, the inflow rate of the gas having a low concentration of carbon dioxide flowing into the storage container is a value measured by a commercially available flow meter.

In the present embodiment, the "gas having a low concentration of carbon dioxide" means a gas in which a total value of carbon monoxide and carbon dioxide is 50 volume ppm or less. In the present embodiment, as the gas having a low concentration of carbon dioxide, it is possible to use the atmosphere or nitrogen gas in which the total content of carbon monoxide and carbon dioxide is 50 volume ppm or less.

<Carbon Dioxide Gas Partial Pressure>

In the present embodiment, the carbon dioxide concentration (unit: ppm) included in the gas present in the airtight container is a value measured by the Methanizer GC-FID method. In the present embodiment, the atmospheric pressure is set to 101325 Pa and the carbon dioxide partial pressure is measured. The product of the carbon dioxide concentration (unit: ppm) and the atmospheric pressure (101325 Pa) is calculated as the carbon dioxide partial pressure.

<Relative Humidity>

In the present embodiment, the relative humidity is a value measured using a commercially available thermo-hygrometer (testo 635-1, thermo-hygrometer). In the present embodiment, the relative humidities are each values measured at room temperature (15° C. to 30° C.).

<Storage Mass/Container Volume of Airtight Container or Storage Container>

In the present embodiment, [storage mass/volume of airtight container or storage container] is the charging mass (g) in the storage container or in the airtight container with respect to the volume (L) of the storage container or of the airtight container.

<Lithium Hydroxide Neutralization Titration Method>

In the present embodiment, the neutralization titration is carried out by the method below.

1.0 g of lithium hydroxide powder and 500 g of pure water are put in a 500 ml beaker and stirred for 5 minutes.

After stirring, 0.1 mol/L hydrochloric acid is added dropwise to 50 g of the filtrate and the pH of the filtrate is measured with a pH meter.

Assuming that the titer of hydrochloric acid at pH=8.3±0.1 is Am1 and the titer of hydrochloric acid at pH=4.5±0.1 is Bm1, the concentration of lithium carbonate and the concentration of lithium hydroxide remaining in the lithium hydroxide powder are calculated with the calculation formulas below. In the formulas below, the molecular weights of lithium carbonate and lithium hydroxide are calculated with each of the atomic weights of H; 1.000, Li; 6.941, C; 12.000, and O; 16.000. The molecular weight of lithium carbonate is 73.882 and the molecular weight of lithium hydroxide is 23.941.

Lithium carbonate concentration (%)=0.1×(B−A)/1000×73.882/(1×50/500)×100

Lithium hydroxide concentration (%)=0.1×(2A−B)/1000×23.941/(1×50/500)×100

<Measurement of Increase Rate of Lithium Carbonate>

In the present embodiment, the rate of increase of lithium carbonate in the lithium hydroxide powder is measured by the method below.

First, during a storage period of 7 consecutive days or more, the lithium hydroxide powder is sampled on each of the 0th day, the 1st day, the 3rd day, the 7th day, and optionally the 14th day. Then, the concentration of lithium carbonate in the lithium hydroxide powder is measured by the neutralization titration method.

Next, the time (hr) is plotted on the horizontal axis and the lithium carbonate concentration (% by mass) is plotted on the vertical axis, and a linearly approximated slope is calculated as the increase rate.

<Measurement of Particle Size Distribution>

In the present embodiment, the average particle diameter of the lithium hydroxide powder is a value measured by a dry method using a laser diffraction particle size distribution meter (MS2000 manufactured by Malvern).

Specifically, the particle size distribution is measured to obtain a volume-based cumulative particle size distribution curve. In the obtained cumulative particle size distribution curve, the value of the particle diameter (D50) viewed from the fine particle side at the time of 50% accumulation is taken as the average particle diameter of the lithium hydroxide powder.

<Measurement of Electrolysis Amount>

In the present embodiment, the electrolysis amount (which may be referred to as a "float electricity amount") is a value measured by the method below.

A positive electrode active material is manufactured using lithium hydroxide powder, and a lithium secondary battery (coin-type cell) is produced using the obtained positive electrode active material.

More specifically, a positive electrode for a lithium secondary battery is produced in which a positive electrode mixture including a positive electrode active material, a conductive material (acetylene black), and a binder (PVdF) is supported on an aluminum foil serving as a current collector. Then, the aluminum foil surface of the positive electrode for the lithium secondary battery is placed face down on the lower lid of a coin cell (manufactured by Hohsen Co., Ltd.) for a coin-type battery R2032, and a laminated film separator (a heat-resistant porous layer is laminated (thickness: 25 µm) on a porous film formed of polypropylene) is placed thereon.

Here, 300 µL of an electrolytic solution is injected therein. The electrolytic solution used is prepared by adding 1% by volume of vinylene carbonate to a mixture of ethylene carbonate, dimethyl carbonate, and ethyl methyl carbonate (16:10:74 (volume ratio)) and dissolving $LiPF_6$ therein so as to be 1.3 mol/L.

Next, using metallic lithium as the negative electrode, the negative electrode is placed on the upper side of the laminated film separator, the upper lid is covered with a gasket, and caulking is carried out with a caulking machine to produce the lithium secondary battery (coin-type battery R2032, may be referred to below as a "coin-type battery").

Further, using the obtained coin-type cell, a test is performed as follows.

That is, at a test temperature of 60° C., a maximum charging voltage of 4.3 V, a charging time of 60 hours, and a charging current of 0.2 CA, constant current/constant voltage charging is carried out. In the constant current/constant voltage charging, the accumulated amount of electricity over a period of 30 hours after shifting to the constant voltage mode of 4.3 V was calculated as the float electricity amount (mAh/g).

<Method for Manufacturing Lithium Hydroxide Powder>

The present invention relates to a method for manufacturing lithium hydroxide powder. According to the present invention, the storage of the lithium hydroxide powder is carried out under a carbonation-suppressing step which satisfies specific requirements. In the present embodiment, it is possible to suppress the carbonation reaction of lithium hydroxide, which is a reaction between carbon dioxide and lithium hydroxide powder in the air. Due to this, it is possible to suppress the generation of lithium carbonate during storage and to manufacture a lithium hydroxide powder having a low lithium carbonate content.

The lithium hydroxide powder manufactured according to the present invention has an increase rate of lithium carbonate in the lithium hydroxide powder of 0.002% by mass/hour or less in a case of being stored for 7 days or more under the storage conditions described below.

A description will be given of a preferable embodiment of the present invention.

First Embodiment

The present embodiment is a method for manufacturing a lithium hydroxide powder, the method including a pulverizing step of pulverizing coarse particles of lithium hydroxide to obtain lithium hydroxide powder, and a carbonation-suppressing step of storing the lithium hydroxide powder in an airtight container in an atmosphere satisfying requirements (1) and (2), in which the atmosphere in the airtight container satisfies (1) and (2) below.

(1) A partial pressure of carbon dioxide gas is 100 Pa or less with respect to a total amount of gas present in the airtight container.

(2) A relative humidity in the airtight container is 60% or less.

[Pulverizing Step]

In the present embodiment, first, coarse particles of lithium hydroxide are pulverized to obtain lithium hydroxide powder. Specifically, for example, the coarse particles of lithium hydroxide are pulverized with a dry pulverizer or the like until the average particle diameter (D50) measured by the above method becomes 15 µm or less. From the viewpoint of suppressing aggregation of the positive electrode active material obtained by mixing and calcining the lithium hydroxide after pulverization with a precursor described below, D50 of the lithium hydroxide after pulverization is preferably 10 µm or less, more preferably 7 µm or less, and even more preferably 5 µm or less. In addition, when mixed with the precursor described below, from the viewpoint of improving the uniformity of mixing, D50 of lithium hydroxide after pulverization is preferably 0.1 µm or more, more preferably 0.5 µm or more, and even more preferably 1 µm or more. It is possible to arbitrarily combine the upper limit value and the lower limit value of the average particle diameter (D50) of lithium hydroxide after pulverization. Examples of the combination of the upper limit value and the lower limit value of the average particle diameter (D50) of lithium hydroxide after pulverization include 0.1 µm or more and 10 µm or less, 0.5 µm or more and 7 µm or less, and 1 µm or more and 5 µm or less.

[Carbonation-Suppressing Step]

In the present embodiment, a carbonation-suppressing step of storing the obtained lithium hydroxide powder in an airtight container is provided. The atmosphere in the airtight container satisfies requirements (1) and (2).

(1) The partial pressure of carbon dioxide gas is 100 Pa or less with respect to the total amount of gas present in the airtight container.

(2) The relative humidity in the airtight container is 60% or less.

In the present embodiment, the carbonation-suppressing step means a storage period after pulverizing coarse particles of lithium hydroxide until the lithium hydroxide powder is used as a raw material of a positive electrode active material for a lithium secondary battery. Examples of the storage period include 7 days or more, 10 days or more, or 14 days or more.

From the viewpoint of suppressing the generation of lithium carbonate obtained by carbonating lithium hydroxide, it is preferable to shorten the storage period as much as possible after pulverizing the coarse particles of lithium hydroxide and before use.

However, at the manufacturing site, the place where the step of pulverizing coarse particles of lithium hydroxide is performed may be physically separated from the place where the lithium hydroxide powder is used in the subsequent steps.

In addition, in order to improve the production efficiency, the step of pulverizing coarse particles of lithium hydroxide may be carried out in advance. In such a case, by providing the carbonation-suppressing step which satisfies the requirements (1) and (2), even in a case where time elapses from the pulverizing to the use, it is possible to suppress the generation of lithium carbonate obtained by carbonating lithium hydroxide.

After the pulverizing step, the time until the storage in the airtight container is preferably 30 minutes or less, more preferably 20 minutes or less, and particularly preferably 15 minutes or less.

Within the above time, it is possible to handle the lithium hydroxide powder in the atmosphere until the storage in the airtight container after the pulverizing step.

In the present embodiment, "airtight container" means a container for storing in a tightly closed state, which prevents gas from entering the inside of the container from the outside.

Examples of a method for filling the lithium hydroxide powder in the airtight container include the methods below.

First, the container satisfying requirements (1) and (2) described below is filled with the lithium hydroxide powder under atmospheric conditions. At this time, filling is performed such that a predetermined storage mass/volume of the airtight container is obtained.

Next, with a bag-shaped container, a lid is set, heat sealing is performed and the container is sealed.

The shape of the container is not particularly limited and may be a bag-shaped container or a box-shaped container. The material of the container is not particularly limited, but aluminum laminate or SUS is preferable.

Requirement (1)

In the present embodiment, from the viewpoint of suppressing the generation of lithium carbonate due to the reaction between the lithium hydroxide powder and carbon dioxide gas, the atmosphere in the airtight container has a carbon dioxide gas partial pressure of 100 Pa or less, preferably 80 Pa or less, more preferably 60 Pa or less, and particularly preferably 50 Pa or less.

Requirement (2)

In the present embodiment, from the viewpoint of suppressing moisture absorption of the lithium hydroxide powder, the storage atmosphere in the airtight container for storing the lithium hydroxide powder at a temperature of 15° C. to 30° C. has a relative humidity of 60% or less, preferably 55% or less, and more preferably 53% or less. In addition, from the viewpoint of suppressing excessive desorption of hydration water or adsorbed water of the lithium hydroxide powder, the relative humidity in the airtight container is preferably 10% or more, and more preferably 15% or more. It is possible to arbitrarily combine the upper limit value and the lower limit value. Examples of the combination of the upper limit value and the lower limit value include 10% or more and 55% or less, and 15% or more and 53% or less.

Second Embodiment

The present embodiment is a method for manufacturing a lithium hydroxide powder provided with a pulverizing step of pulverizing coarse particles of lithium hydroxide to obtain lithium hydroxide powder, and a carbonation-suppressing step of storing the lithium hydroxide powder after pulverization in a storage container.

[Pulverizing Step]

The description relating to the pulverizing step of the present embodiment is the same as the description of the pulverizing step of the first embodiment.

[Carbonation-Suppressing Step]

After being filled with the pulverized product, the lithium hydroxide powder is stored in a storage container. The carbonation-suppressing step means a storage period after the coarse particles of lithium hydroxide are pulverized until the lithium hydroxide powder is used as a raw material of a positive electrode active material for a lithium secondary battery. Examples of the storage period include 7 days or more, 10 days or more, or 14 days or more.

For example, a box-shaped storage container used in the carbonation-suppressing step is provided with a circulating means for circulating the gas having a low concentration of carbon dioxide at a constant flow rate in the storage container. The circulating means has an introduction path for introducing a gas having a low concentration of carbon dioxide into the storage container and a discharge path for discharging an exhaust gas from the storage container.

The inflow rate of the gas having a low concentration of carbon dioxide into the storage container is 15 L/min or less.

In the present embodiment, for example, the box-shaped storage container is filled with lithium hydroxide powder. At this time, filling is performed such that a predetermined storage mass/volume of the airtight container is obtained.

Next, the result is covered and sealed.

The material of the box-shaped container is not particularly limited, but SUS is preferable.

In the present embodiment, after the storage container is filled with lithium hydroxide powder, a gas having a low concentration of carbon dioxide is introduced from the introduction path and the gas having a low concentration of carbon dioxide is discharged from the discharge path, such that the gas having a low concentration of carbon dioxide is circulated at a constant flow rate in the storage container. By this circulating means, the gas inside the storage container is replaced with the gas having a low concentration of carbon dioxide.

In the present embodiment, the gas having a low concentration of carbon dioxide inflow rate is preferably 15 L/min or less, more preferably 14 L/min or less, and particularly preferably 13 L/min or less.

Due to the inflow rate of the gas having a low concentration of carbon dioxide being the above upper limit value or less, the inside of the storage container is suitably replaced with the gas having a low concentration of carbon dioxide. This makes it possible to prevent the lithium hydroxide powder from coming into contact with carbon dioxide and to suppress the generation of lithium carbonate obtained by carbonating lithium hydroxide.

The gas having a low concentration of carbon dioxide is preferably nitrogen gas, argon gas, or decarbonated gas, in which the total value of carbon monoxide and carbon dioxide is 50 ppm by volume or less, and more preferably nitrogen gas.

Storage Mass/Volume of Airtight Container or Storage Container

In the first embodiment and second embodiment, the charging mass (g) in the storage container or the airtight container with respect to the volume (L) of the storage container or the airtight container (storage mass/volume of airtight container or storage container) is preferably 2 g/L or more, more preferably 4 g/L or more, and particularly preferably 10 g/L or more. When "storage mass/volume of airtight container or storage container" is in the above range, it is possible to prevent lithium hydroxide powder from coming into contact with carbon dioxide in the container and to suppress the generation of lithium carbonate obtained by carbonating lithium hydroxide.

The lithium hydroxide powder manufactured according to the first embodiment or second embodiment has a low content of lithium carbonate as an impurity. For this reason, in a case of being used as a raw material for the positive electrode active material, it is possible to suppress the bringing-in of lithium carbonate into the positive electrode active material to be manufactured. When the amount of lithium carbonate in the positive electrode active material is small, the generation of carbon dioxide gas due to the decomposition of lithium carbonate during charging is suppressed. For this reason, the positive electrode active material for a lithium secondary battery manufactured using the lithium hydroxide powder manufactured according to the present embodiment has an excellent effect in that the electrolysis amount is small during battery charging.

<Method for Manufacturing Positive Electrode Active Material for Lithium Secondary Battery>

The present embodiment is a method for manufacturing a positive electrode active material for a lithium secondary battery provided with a step of manufacturing a lithium hydroxide powder by the manufacturing method of the present invention, and a calcining step of mixing the obtained lithium hydroxide powder and a transition metal precursor and calcining the obtained mixture.

[Step of Manufacturing Lithium Hydroxide Powder]

In the present embodiment, the step of manufacturing the lithium hydroxide powder is carried out by the method for manufacturing a lithium hydroxide powder of the present invention.

[Calcing Step]

This step is a step of mixing the obtained lithium hydroxide powder and the transition metal precursor and calcining the obtained mixture. The transition metal precursor is preferably a metal composite compound including a metal other than lithium, for example, a metal formed of nickel, cobalt, manganese, and any other metal, and more preferably a metal composite oxide or a metal composite hydroxide. The metal composite compound (transition metal precursor) is dried and then mixed with the obtained lithium hydroxide powder. Then, the obtained mixture is calcined to obtain a calcined product.

The calcining time and calcining temperature may be appropriately adjusted depending on the transition metal precursor to be used.

[Optional Steps]

In the present embodiment, after the calcining step, a washing step and a drying step may be included as optional steps. The washing step is a step of washing the obtained calcined product and may be carried out with pure water or a known washing liquid. The drying step is a step of separating the lithium positive electrode active material from the washing liquid by filtration or the like and carrying out drying. Then, after pulverization, the results are appropriately classified to obtain a positive electrode active material applicable to a lithium secondary battery.

<Package>

The present embodiment is a package provided with a lithium hydroxide powder and a container airtightly filled with the lithium hydroxide powder, in which the partial pressure of carbon dioxide gas with respect to the total amount of gas present in the container is 100 Pa or less and the relative humidity in the container is 60% or less.

In the package of the present embodiment, contact between the lithium hydroxide powder and carbon dioxide inside the package is suppressed. For this reason, carbonation of lithium hydroxide is less likely to occur in the package and lithium carbonate is less likely to be generated. Thus, it is possible to provide a lithium raw material for manufacturing a positive electrode active material for a lithium secondary battery with a small amount of impurities.

In the package according to the present embodiment, the container is preferably provided with a container body which stores lithium hydroxide powder, and a lid portion which covers an opening of the container body. The shape and material of such a container are not particularly limited. Examples of the shape include a drum can type, a pail can type, a box type, or the like. Examples of the material include metal and resin.

In addition, the container may be a bag-shaped film packaging container using a laminated film. In such a case, the laminated film is preferably a laminated film having a resin film and a metal layer laminated on at least one surface of the resin film. Aluminum is preferable as the metal material forming the metal layer. In addition, as a method for laminating the metal layer on the resin film, a vapor deposition method is preferable.

Furthermore, the oxygen permeability of the laminated film is preferably 1 ml/m$^2$·day·atm or less. It is possible to equate the oxygen permeability of the laminated film with the carbon dioxide permeability. For this reason, when the oxygen permeability is within the above range, it is possible to determine that the carbon dioxide permeability is also approximately 1 ml/m$^2$·day·atm or less. "Oxygen permeability" refers to a value measured according to JIS-K-7126-1: 2006 "Differential Pressure Method".

According to the package of the present embodiment, it is possible to suppress contact between carbon dioxide and lithium hydroxide during storage or circulation of the lithium hydroxide powder. For this reason, it is possible to provide a lithium hydroxide powder in which the generation of lithium carbonate obtained by carbonating lithium hydroxide is suppressed.

EXAMPLES

Next, a more detailed description will be given of the present invention with reference to Examples.

<Method for Measuring Gas Inflow Rate>

The inflow rate of the gas flowing into the container was measured by a commercially available flow meter (Koflock, model number RK type).

<Carbon Dioxide Partial Pressure>

The carbon dioxide concentration (unit: ppm) included in the gas present in the airtight container was measured by the Methanizer GC-FID method (manufactured by Shimadzu Corporation, model number: GC-2014). The carbon dioxide partial pressure was measured by setting the atmospheric pressure to 101325 Pa. The product of the carbon dioxide concentration (unit: ppm) and atmospheric pressure (101325 Pa) was calculated as the carbon dioxide partial pressure.

<Relative Humidity>

The relative humidity was measured using a commercially available thermo-hygrometer (testo 635-1, thermo-hygrometer). The relative humidity is a value measured at each temperature shown in Table 1 below.

<Oxygen Permeability>

The oxygen permeability was measured in accordance with JIS-K-7126-1: 2006 "Differential Pressure Method".

<Storage Mass/Volume of Airtight Container or Storage Container>

[Storage Mass/Volume of Airtight Container or Storage Container] is the charging mass (g) in the storage container or in the airtight container with respect to the volume (L) of the storage container or of the airtight container.

<Lithium Hydroxide Neutralization Titration Method>

1.0 g of lithium hydroxide monohydrate powder and 500 g of pure water were put into a 500 ml beaker and stirred for 5 minutes.

After stirring, 0.1 mol/L hydrochloric acid was added dropwise to 50 g of the filtrate and the pH of the filtrate was measured with a pH meter.

Assuming that the titer of hydrochloric acid at pH=8.3±0.1 is Am1 and the titer of hydrochloric acid at pH=4.5±0.1 is Bm1, the concentration of lithium carbonate and the concentration of lithium hydroxide remaining in the lithium hydroxide monohydrate powder were calculated with the calculation formulas below. In the formulas below, the molecular weights of lithium carbonate and lithium hydroxide were calculated with the atomic weights of H; 1.000, Li; 6.941, C; 12.000, O; 16.000. The molecular weight of lithium carbonate is 73.882 and the molecular weight of lithium hydroxide is 23.941.

Lithium carbonate concentration (%)=0.1×(B−A)/ 1000×73.882/(1×50/500)×100

Lithium hydroxide concentration (%)=0.1×(2A−B)/ 1000×23.941/(1×50/500)×100

<Measurement of Increase Rate of Lithium Carbonate>

First, during a storage period of 7 consecutive days or more, the lithium hydroxide monohydrate powder was sampled on each of the 0th day, the 1st day, the 3rd day, the 7th day, and optionally the 14th day. Thereafter, the concentration of lithium carbonate in the lithium hydroxide monohydrate powder was measured by the neutralization titration method.

Next, time (hr) was plotted on the horizontal axis and lithium carbonate concentration (% by mass) was plotted on the vertical axis, and a linearly approximated slope was calculated as the increase rate.

<Concentration of Lithium Carbonate after Storage>

For the lithium hydroxide monohydrate powder after storage for 7 days or more, the lithium carbonate concentration (% by mass) was measured by neutralization titration.

<Measurement of Particle Size Distribution>

The average particle diameter of the lithium hydroxide monohydrate powder was measured by a dry method using a laser diffraction particle size distribution meter (MS2000 manufactured by Malvern).

Specifically, the particle size distribution was measured to obtain a volume-based cumulative particle size distribution curve. In the obtained cumulative particle size distribution curve, the value of the particle diameter (D50) viewed from the fine particle side at the time of 50% accumulation was taken as the average particle diameter of the lithium hydroxide monohydrate powder.

<Measurement of Electrolysis Amount>

A positive electrode active material was manufactured using each of the obtained lithium hydroxide monohydrate powders, and a lithium secondary battery (coin-type cell) was produced using the obtained positive electrode active material.

More specifically, a positive electrode active material, a conductive material (acetylene black), and a binder (PVdF) were added to obtain a composition of positive electrode active material for lithium secondary battery:conductive material:binder=92:5:3 (mass ratio), N-methyl-2-pyrrolidone was used as a dispersion solvent, and kneading was carried out to prepare a paste-like positive electrode mixture. The obtained positive electrode mixture was coated on an Al foil having a thickness of 40 μm, which serves as a current collector, and dried with warm air at 60° C. to obtain a positive electrode for a lithium secondary battery.

The electrode area of this positive electrode for a lithium secondary battery was 1.65 cm². Then, the aluminum foil surface of the positive electrode for the lithium secondary battery was placed face down on the lower lid of a coin cell (manufactured by Hohsen Co., Ltd.) for a coin-type battery R2032, and the laminated film separator (a heat-resistant porous layer was laminated (thickness: 25 μm) on a porous film formed of polypropylene) was placed thereon. Here, 300 μL of an electrolytic solution was injected therein. The electrolytic solution used was prepared by adding 1% by volume of vinylene carbonate to a mixture of ethylene carbonate, dimethyl carbonate, and ethyl methyl carbonate 16:10:74 (volume ratio) and dissolving LiPF$_6$ therein so as to be 1.3 mol/L.

Next, using metallic lithium as the negative electrode, the negative electrode was placed on the upper side of the laminated film separator, the upper lid was covered with a gasket, and caulking was carried out with a caulking machine to produce the lithium secondary battery (coin-type battery R2032, may be referred to below as a "coin-type battery").

Further, using the obtained coin-type cell, a test was performed as follows. That is, at a test temperature of 60° C., a maximum charging voltage of 4.3 V, a charging time of 60 hours, and a charging current of 0.2 CA, constant current/constant voltage charging was carried out. In the constant current/constant voltage charging, the accumulated amount of electricity over a period of 30 hours after shifting to the constant voltage mode of 4.3 V was calculated as the float electricity amount (mAh/g).

Example 1

[Pulverizing Step]

Coarse particles of lithium hydroxide monohydrate were dry pulverized to obtain a lithium hydroxide monohydrate powder 1 having an average particle diameter of 3 μm.

[Carbonation-Suppressing Step]

Lithium hydroxide monohydrate powder 1 was filled in an aluminum laminate bag under an environment of a carbon dioxide partial pressure of 40 Pa and in a relative humidity of 50% (28° C.). At this time, filling was carried out such that the ratio of the weight of the lithium hydroxide monohydrate powder 1 and the volume of the aluminum laminate bag was 20 g/L and the bag was sealed by heat sealing and stored for 7 days to obtain lithium hydroxide monohydrate S1. The oxygen permeability of the laminated film of the aluminum laminate bag was 1 ml/m²-day-atm.

[Manufacturing of Positive Electrode Active Material 1]

A mixed raw material solution obtained by mixing an aqueous solution of nickel sulfate, an aqueous solution of cobalt sulfate, and an aqueous solution of aluminum sulfate such that the atomic ratio of nickel atoms, cobalt atoms, and aluminum atoms was 88:9:3 was continuously added dropwise to an aqueous solution of sodium hydroxide together with an aqueous solution of ammonium sulfate, and then, nickel-cobalt-aluminum composite hydroxide particles were obtained by carrying out dehydrating, isolating, and drying. An obtained nickel-cobalt-aluminum composite hydroxide 1 was calcined at 600° C. for 8 hours to obtain a nickel-cobalt-aluminum composite oxide 1.

The nickel-cobalt-aluminum composite oxide 1 and the lithium hydroxide monohydrate powder S1 were weighed and mixed in a molar ratio of Li/(Ni+Co+Al)=1.10 and then calcined at 720° C. for 6 hours in an oxygen atmosphere to obtain a calcined product 1. Next, the calcined product 1 was added to pure water to adjust a slurry-like liquid, which was stirred, then filtered and dried to obtain a positive electrode active material 1.

[Measuring]

For the obtained lithium hydroxide monohydrate powder S1, according to the above method, storage mass/volume of airtight container or storage container (in Table 1, described as "storage mass/volume"), the increase rate of lithium carbonate, and the concentration of lithium carbonate after storage were measured, and the results are shown in Table 1. In addition, using the obtained positive electrode active material 1, a coin-type battery was produced by the method described above, the electrolysis amount was measured, and the results are shown in Table 1.

Example 2

[Carbonation-Suppressing Step]

A lithium hydroxide monohydrate powder S2 was obtained by the same method as in Example 1 except that storage mass/volume of airtight container or storage container and the relative humidity were changed to the values shown in Table 1 and the airtight container was changed from an aluminum laminated container to a box-shaped airtight container.

[Manufacturing of Positive Electrode Active Material 2]

Using the obtained lithium hydroxide monohydrate S2, a positive electrode active material 2 was obtained by the same method as in Example 1.

[Measuring]

For the obtained lithium hydroxide monohydrate powder S2, according to the above method, the storage mass in storage mass/volume of airtight container or storage container (in Table 1, described as "storage mass/volume"), the increase rate of lithium carbonate, and the concentration of lithium carbonate after storage were measured, and the results are shown in Table 1. In addition, using the obtained positive electrode active material 1, a coin-type battery was produced by the method described above, the electrolysis amounts were each measured, and the results are shown in Table 1.

Example 3

[Carbonation-Suppressing Step]

The lithium hydroxide monohydrate powder 1 was filled in a storage container made of resin provided with a circulating means, for circulating a gas having a low concentration of carbon dioxide in the storage container at a set flow rate, having an introduction path for introducing a gas having a low concentration of carbon dioxide and a discharge path for discharging an exhaust gas from the storage container, such that the ratio of the weight of the lithium hydroxide monohydrate powder 1 and the volume of the storage container was 17 g/L, then, stored for 14 days while introducing nitrogen gas into the container from the introduction path at 10 L/min and circulating nitrogen gas in the container to obtain lithium hydroxide monohydrate S3.

[Manufacturing of Positive Electrode Active Material 3]

Using the obtained lithium hydroxide monohydrate S3, a positive electrode active material 3 was obtained by the same method as in Example 1.

[Measuring]

For the obtained lithium hydroxide monohydrate powder S3, according to the above method, the storage mass in storage mass/volume of airtight container or storage container (in Table 1, described as "storage mass/volume"), the increase rate of lithium carbonate, and the concentration of lithium carbonate after storage were measured, and the results are shown in Table 1. In addition, using the obtained positive electrode active material 3, a coin-type battery was produced by the method described above, the electrolysis amounts were each measured, and the results are shown in Table 1.

Comparative Example 1

[Pulverizing Step]

Coarse particles of lithium hydroxide monohydrate were dry pulverized to obtain lithium hydroxide monohydrate powder having an average particle diameter of 3 μm.

[Carbonation-Suppressing Step]

Lithium hydroxide monohydrate powder CS1 was obtained by the same method as in Example 3 except that the storage mass in storage mass/volume of airtight container or storage container, type of gas introduced, gas inflow rate, $CO_2$ partial pressure, and the relative humidity were changed to the values shown in Table 1. Storage period was for 7 days.

[Measuring]

For the obtained lithium hydroxide monohydrate powder CS1, according to the above method, the storage mass in the storage mass/volume of airtight container or storage container, the increase rate of lithium carbonate, and the concentration of lithium carbonate after storage were measured, and the results are shown in Table 1.

Comparative Example 2

[Carbonation-Suppressing Step]

Lithium hydroxide monohydrate powder CS2 was obtained by the same method as in Example 3 except that the storage mass in storage mass/volume of airtight container or storage container, type of gas introduced, gas inflow rate, $CO_2$ partial pressure, and the relative humidity were changed to the values shown in Table 1. The result was stored for 3 days.

[Manufacturing of Positive Electrode Active Material C2]

Using the obtained lithium hydroxide monohydrate CS2, a positive electrode active material C2 was obtained in the same method as in Example 1.

[Measuring]

For the obtained lithium hydroxide monohydrate powder CS2, according to the above method, the storage mass in storage mass/volume of airtight container or storage container, the increase rate of lithium carbonate, and the concentration of lithium carbonate after storage were measured, and the results are shown in Table 1. In addition, using the obtained positive electrode active material C2, a coin-type battery was produced by the method described above, the electrolysis amounts were each measured, and the results are shown in Table 1.

In Comparative Example 1, since the value of the increase rate of lithium carbonate was larger than that of Comparative Example 2 and the concentration of lithium carbonate after storage was also high, it was possible to predict that the electrolysis amount would also be high, thus, the electrolysis amount was not measured.

TABLE 1

| | Atmosphere in container | Atmosphere gas inflow rate [L/min] | CO2 partial pressure [Pa] | Relative humidity [%] | Storage mass in container/volume ratio [g/L] | Increase rate of lithium carbonate [% by mass/hr] | Lithium carbonate concentration after storage [% by mass] | Electrolysis amount [mAh/g] |
|---|---|---|---|---|---|---|---|---|
| Comparative Example 1 | Atmosphere | 1000 | 40 | 50 (28° C.) | 0.2 | 0.21 | 45 | Not measured |
| Comparative Example 2 | Dry Air | 80 | 40 | 23 (26° C.) | 1 | 0.20 | 21 | 18.4 |

TABLE 1-continued

|  | Atmosphere in container | Atmosphere gas inflow rate [L/min] | CO2 partial pressure [Pa] | Relative humidity [%] | Storage mass in container/volume ratio [g/L] | Increase rate of lithium carbonate [% by mass/hr] | Lithium carbonate concentration after storage [% by mass] | Electrolysis amount [mAh/g] |
|---|---|---|---|---|---|---|---|---|
| Example 1 | Atmosphere | 0 | 40 | 50 (28° C.) | 20 | −0.003 | 5 | 7.7 |
| Example 2 | Atmosphere | 0 | 40 | 40 (15° C.) | 2 | 0.001 | 8.1 | 6.9 |
| Example 3 | Nitrogen | 10 | <1 | <20 (26° C.) | 17 | 0.001 | 4.8 | 9.8 |

As shown in the results shown in Table 1, the lithium hydroxide monohydrate powders of Examples 1 to 3 to which the present invention was applied had a low lithium carbonate content. The positive electrode active materials using the lithium hydroxide monohydrate powders of Examples 1 to 3 had a small electrolysis amount.

The invention claimed is:

1. A method for manufacturing a lithium hydroxide powder, the method including:
   a pulverizing step of pulverizing coarse particles of lithium hydroxide to obtain a lithium hydroxide powder; and
   a carbonation-suppressing step of storing the lithium hydroxide powder after the pulverization in a storage container,
   wherein the storage container is provided with a circulator for circulating a gas having a low concentration of carbon dioxide at a set flow rate in the storage container,
   the circulator has an introduction path for introducing the gas into the storage container and a discharge path for discharging the gas from the storage container, and
   an inflow rate of the gas into the storage container is 15 L/min or less.

2. The method for manufacturing the lithium hydroxide powder according to claim 1,
   wherein a charging mass (g) in the storage container with respect to a volume (L) of the storage container (storage mass/volume of storage container) is 2 g/L or more.

3. A method for manufacturing a positive electrode active material for a lithium secondary battery comprising:
   a step of manufacturing the lithium hydroxide powder by the manufacturing method according to claim 1; and
   a calcining step of mixing the lithium hydroxide powder and a transition metal precursor, and calcining the mixed lithium hydroxide powder and the transition metal precursor.

* * * * *